United States Patent [19]

Myers et al.

[11] Patent Number: 4,655,482
[45] Date of Patent: Apr. 7, 1987

[54] TUBE COUPLING DEVICE

[75] Inventors: William N. Myers, Huntsville, Ala.; Leopold A. Hein, deceased, late of Flintville; Birgit G. Hein, executor, Sparta, both of Tenn.

[73] Assignee: The United States of America as represented by the Administrator of the National Aeronautics and Space Administration, Washington, D.C.

[21] Appl. No.: 853,361

[22] Filed: Apr. 10, 1986

Related U.S. Application Data

[63] Continuation of Ser. No. 692,801, Jan. 18, 1985, abandoned.

[51] Int. Cl.[4] .............................. F16L 35/00
[52] U.S. Cl. ........................ 285/81; 285/85; 285/91; 285/305
[58] Field of Search .................... 285/80, 81, 82, 84, 285/85, 86, 91, 305, 403

[56] References Cited

U.S. PATENT DOCUMENTS

| | | | |
|---|---|---|---|
| 499,312 | 6/1893 | Turner | 285/85 X |
| 554,666 | 2/1896 | Feltner | 285/85 |
| 609,738 | 8/1898 | Emmitt | 285/85 |
| 643,358 | 2/1900 | Konold | 285/85 |
| 995,966 | 6/1911 | Hill | 285/85 |
| 1,576,698 | 3/1926 | Williams | 285/85 |
| 1,862,859 | 6/1932 | Michel | 285/84 |
| 1,871,370 | 8/1932 | Jacques | 285/85 |
| 2,204,392 | 6/1940 | Arm | 285/81 X |
| 2,248,701 | 7/1941 | Fowler | 285/84 X |
| 2,728,895 | 12/1955 | Quackenbush | 285/85 X |
| 3,201,149 | 8/1965 | Bragg | 285/86 X |
| 3,583,667 | 7/1969 | Amneus | 285/86 X |
| 3,587,032 | 6/1971 | Normann | 285/86 X |
| 3,971,575 | 7/1976 | Lesham | 285/85 |
| 3,971,614 | 7/1976 | Paoli et al. | 285/85 X |
| 4,030,798 | 6/1977 | Paoli | 285/85 X |
| 4,113,227 | 9/1978 | Cigliano | 285/84 X |
| 4,205,758 | 6/1980 | Johnson | 285/86 X |

Primary Examiner—Richard J. Scanlan, Jr.
Attorney, Agent, or Firm—Joseph H. Beumer; John R. Manning; Leon D. Wofford, Jr.

[57] ABSTRACT

A first annular ring (44) has a keyed opening (64) sized to fit around the nut region (40) of a male coupling (14), and a second annular ring (42) has a keyed opening (52) sized to fit around the nut (26) of a female coupling (12). Each ring (42, 44) has mating ratchet teeth (56, 62), and these rings (42, 44) are biased together, thereby engaging these teeth (56, 62) and preventing rotation of these rings. This in turn prevents the rotation of the male nut region (40) with respect to the female nut (26). For tube-to-bulkhead locking, one facet (70) of one ring (44) is notched, and a pin (88) is pressed into an opening (84, 86) in the bulkhead (80). This pin (88) is sized to fit within one of the notches (74) in the ring (44), thereby preventing rotation of this ring (44) with respect to the bulkhead (80).

26 Claims, 5 Drawing Figures

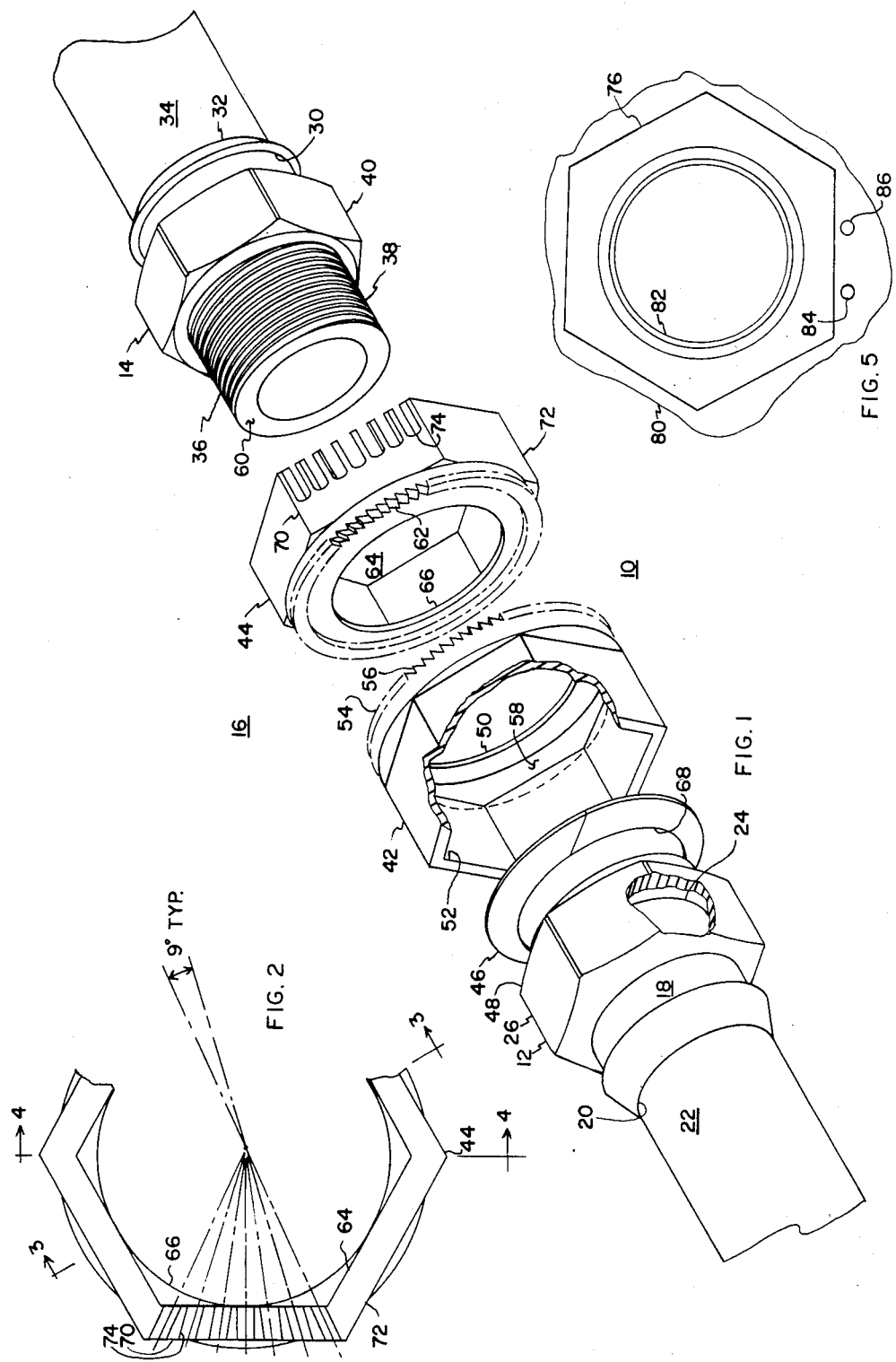

TUBE COUPLING DEVICE

ORIGIN OF THE INVENTION

The invention described herein was made by employees of the United States Government and may be manufactured and used by or for the government of the United States of America for governmental purposes without the payment of any royalties thereon or therefor.

This application is a continuation of application Ser. No. 692,801, filed Jan. 18, 1985 now abandoned.

TECHNICAL FIELD

This invention pertains generally to fluid coupling assemblies, and more particularly to an apparatus for positively locking such together.

BACKGROUND OF THE INVENTION

By their very nature, fluid couplings, which depend for their integrity upon one being threadably torqued into another, are subject to failure because unthreading may occur, particularly in an environment where there is vibration. The problem becomes acute where the fluids being coupled are hazardous or critical equipment failure may occur in the event of a leakage. Both undesirable states may occur where fluid being coupled is an ignitable fuel and the locale is an aircraft or space vehicle.

Currently, and perhaps the best presently known method to lock crucial fluid couplings together, is to secure them with a wire, there typically being openings in portions of mating fittings through which a wire from one to the other may be fastened. The typical problem with this means is that often the wire has too much slack or stretches, so some loosening may occur before positive locking is effected.

Another locking arrangement for locking elements of a conventional two-part fluid coupler is disclosed in U.S. Pat. No. 3,201,149. In this case, the coupling itself is specially constructed wherein a collar nut of one part of the fitting has teeth around an end which mesh with facing teeth on a locking ring of the second part of the fitting. This ring also has teeth around its internal diameter, and these fit over and lock to mating teeth on an outer diameter of a fixed portion of the second part of the fitting. This ring is spring biased to a position where the two sets of teeth are engaged wherein ultimate locking of the two parts of the fitting is effected.

It is the object of this invention to provide a locking assembly which is adapted to lock together elements of existing, standard, fluid couplers and to accomplish this by an assembly which is positive in its locking and yet is relatively simple and inexpensive to manufacture.

SUMMARY OF THE INVENTION

In accordance with this invention, the two relatively tightenable fittings of a coupled joint are each surrounded by a sleeve contoured to firmly grip each fitting, and the sleeves have interengaging teeth. After the fitting has been tightened, these sleeves are held in place by a spring which maintains a selected engagement between the teeth of the sleeves. As the teeth are spaced at a relatively small pitch, the fitting may be quite precisely tightened and yet the sleeves effect secure tightening of them.

BRIEF DESCRIPTION OF THE DRAWINGS

FIG. 1 is an exploded pictorial view, partially broken away, of the hydraulic line coupling device.

FIG. 2 is a planar view, partially broken away, of one sleeve illustrating the notch orientation.

FIG. 5 is a planar view, partially broken away, of the bulkhead and a fitting member showing the alternate pin openings.

DETAILED DESCRIPTION OF THE DRAWINGS

Figure 3:
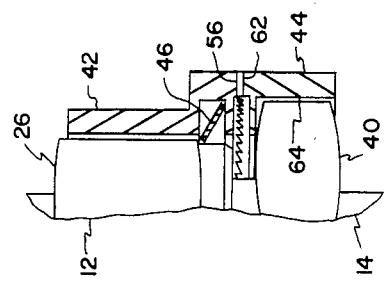
FIG. 3 is an elevational view, partially broken away, of an assembled line-to-line coupling taken along line 3—3 of FIG. 2.

Referring initially to FIG. 1, there is shown an exploded view illustrating the employment of tube locking assembly 10 to lock together fitting members 12 and 14 of a conventional fitting assembly 16. Fitting member 12 includes a tubular element 18 which is connected at one end by swage joint 20 to tube 22. The opposite end 24 of element 18 is typically tapered and machined for sealably engaging a complementary surface. A collar nut 26 encircles end 24 of tubular element 18, and nut 26 is movable both rotationally and longitudinally about tubular element 18.

Fitting member 14 has an end region 30 which is coupled via a swage connection 32 to tube 34, a protruding annular nose 36 having an end region machined to engage end 24 of tubular element 18, a threaded region 38 on which nut 26 is tightened to effect connection, and hexagonal wrench gripping or nut region 40.

Locking assembly 10 includes two interlocking sleeves 42 and 44 and a split washer 46 which is nonplanar in order to function as a spring between the face 48 of nut 26 and inwardly extending shoulder 50 of sleeve 42. Sleeve 42 is generally annular, having a hexagonally keyed opening 52 sized to fit closely around nut 26 of fitting member 12 with little or no play or slippage whereby nut 26 is rotationally locked to sleeve 42. A major portion of the outer periphery of sleeve 42 is hexagonally shaped to enable gripping by a wrench (not shown). Edge 54 of sleeve 42 has a ring of ratchet teeth 56, these teeth generally extending in an axial direction. An annular notch 58 is formed between shoulder 50 and the hexagonal inner surface of sleeve 42, and split washer 46 is installed in this notch by first contracting the washer, this enabled by the split in the washer. Face 60 of fitting member 14 slips through washer 46 and sealably engages with end 24 of element 18, and during such engagement, washer 46 is pressed against shoulder 50 by nut 26. When thusly pressed, washer 46 provides a spring bias that biases sleeve 42 away from nut 26. Split washer 46 would typically be a wave or belleville washer.

Sleeve 44 is similar to sleeve 42, having a ring of ratchet teeth 62 facing and engageable with ratchet teeth 56 of sleeve 42. Ratchet teeth 56 and 62, which face each other, are configured such that, when they are compressably engaged, they enable sleeve 42 and thus nut 26 to be rotated in one direction, a tightening direction, with respect to sleeve 44 but prevent the rotation of nut 26 in an opposite direction. Hexagonally keyed opening 64 within sleeve 44 is similar to hexagonally keyed opening 52 of sleeve 42. It is sized to closely fit around gripping or nut region 40 with little or no slippage. As indicated above, gripping region 40 forms a fixed integral part of fitting member 14, and the latter is fixedly secured to hydraulic tube 34 via swage fitting 32. Shoulder 66 of sleeve 44 projects inwardly from keyed opening 64 and forms a stop for nut region 40. Thus, this shoulder prevents sleeve 44 from sliding completely over and past nut region 40. The openings within sleeve 44, sleeve 42, and washer 46 are all sized to enable threaded region 38 of fitting member 14 to extend through them for engagement with nut 26. The outer portion of sleeve 44 is hexagonally shaped to aid being gripped with a tool (not shown). Differing from that of sleeve 42, one facet 70 of side wall 72 contains a plurality of notches 74 therethrough, and each notch is radially oriented about an axis which passes through the center of opening 64 (FIG. 2). Typically, each axis is displaced from its adjacent axis by an angle of approximately 9°. As will be further explained, the notches are employed when a fitting to be secured is one which is threaded into a bulkhead or some other component. The notches may be omitted where use is as shown in FIG. 1.

To examine installation of this locking device, additional reference is made to FIG. 3. First, washer 46 and sleeve 42 are fitted around collar nut 26, and sleeve 44 is fitted around nut region 40, with a portion of fitting member 14 protruding through opening 64. By means of a wrench, sleeve 42 is gripped and rotated, rotating it in a direction to tighten nut 26 on threaded region 38 of fitting member 14. While this is being accomplished, ratchet teeth 56 and 62 of sleeves 42 and 44 are biased together by washer 46; and as a result, the teeth "ratchet" or ride over each other during such rotation. After nut 26 is tightened to a desired torque, the teeth set and rotation of sleeve 42 in an opposite or loosening direction is prevented by sleeve 44 which is locked to hexagonal gripping region 40 of fitting member 14. Since fitting member 14 is fixed, nut 26 is now locked and the fitting as a whole secured from loosening.

Figure 4:
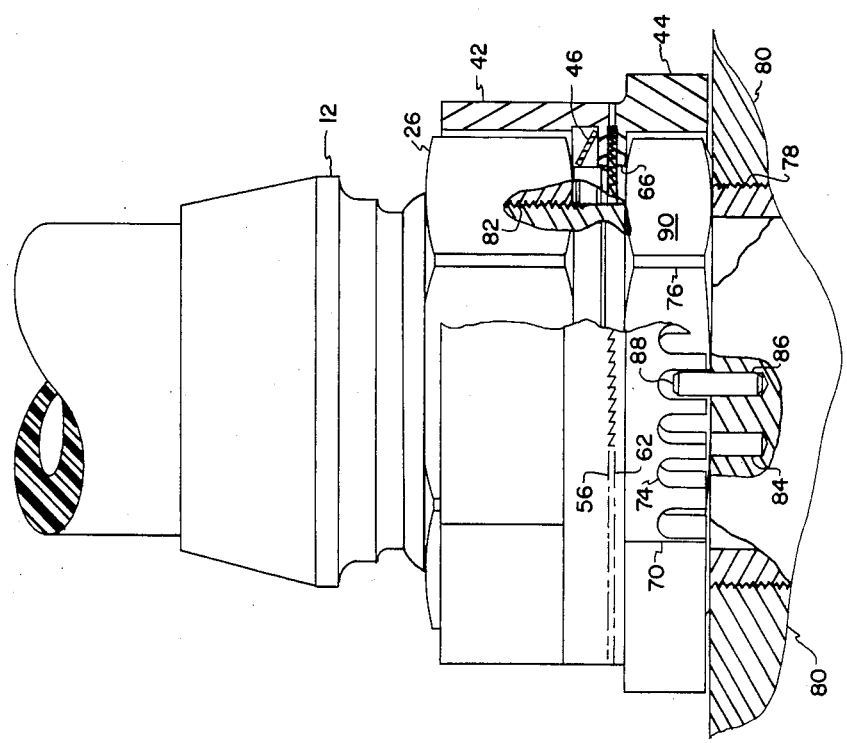
FIG. 4 is an elevational view, partially broken away, of an assembled line-to-component or bulkhead coupling taken along line 4—4 of FIG. 2.

Tube locking assembly 10 may also be employed for locking two rotatable members of fittings coupled to a bulkhead or some such component. Such an arrangement is illustrated in FIGS. 4 and 5 wherein fitting member 76 has one set of threads 78 which thread into bulkhead 80 and a second set of threads 82 which are grasped by collar nut 26 of fitting member 12. Thus, in this case, it is desirable to effect final locking to bulkhead 80 as the stationary element. Sleeve members 42 and 44 function in the manner as already described to effect a locking together of fitting member 76 and collar nut 26. To complete the locking effect, bulkhead 80 has receptacles 84 and 86, and a pin 88 is forcibly pressed into one or the other of them prior to the assembly of sleeves 42 and 44.

To determine which receptacle 84 or 86 pin 88 is to be pressed into, fitting member 76 is initially threaded into bulkhead 80 and tightened to its minimum acceptable torque pressure. Sleeve 44 is then positioned around nut region 90, and a check is made to see if one of holes 84 or 86 lines up with one of notches 74. If there is such an alignment, then sleeve 44 is removed from nut region 90, pin 88 is pressed into the aligning hole, and sleeve 44 is once again positioned around nut region 90, with pin 88 extending into the aligning notch 74. Once sleeve 44 is thereby positioned, the remaining components of tube locking assembly 10 are assembled as described.

On the other hand, should there be no such alignment between one of receptacles 84 or 86 and one of notches 74, fitting member 76 is rotated slightly to a greater torque pressure until such alignment is enabled. Then, pin 88 is pressed into the aligning hole in bulkhead 80, and locking assembly 10 is connected as indicated.

With this assembly, there are four locking interfaces. The first is between collar nut 26 and locking sleeve 42; the second is between teeth 56 and 62 of locking sleeves 42 and 44, respectively; the third is between fitting member 76 or 14 (as the case may be) and sleeve 44; and the fourth is between sleeve 44 and bulkhead 80 via pin 88. These four locking intefaces prevent the uncoupling of collar nut 26 from fitting member 76 or 14 and also the uncoupling of fitting member 76 from bulkhead 80. As shown, the locking assembly of this invention works with standard fittings and positively interlocks them to prevent them from loosening and thereby becoming a fluid coupling failure.

We claim:
1. A tube coupling assembly comprising:
   a first coupling member having a female threaded inner portion and an outer surface comprising a series of discrete engageable surfaces;
   a first sleeve having inner surfaces configured to slidably fit over and engage said outer surface of said first coupling and including axially extending first interlocking edge regions about at least a portion of said sleeve;
   a second coupling including a male threaded region, an additional threaded region on an end opposite to that of said male threaded region and an outer surface region having a series of discrete and engageable surfaces;
   a second sleeve having inner surfaces configured to slidably fit over and engage said engageable surfaces of said second coupling member and including axially extending second interlocking edge regions configured to engage and lock into said first interlocking edge regions of said first sleeve and a plurality of axially directed openings opposite to the interlocking edge regions of said second sleeve; and
   bias means for biasing said sleeves together whereby said interlocking edge regions are interlocked and said coupling members are locked together.

2. An assembly as set forth in claim 1 wherein said axially directed openings are centered on radii spaced 9° apart.

3. An assembly as set forth in claim 1 wherein said second sleeve is configured having a series of discrete and engageable surfaces, and said axially directed openings are located in one of said discrete and engageable surfaces of said second sleeve.

4. An assembly as set forth in claim 1 further comprising a third coupling member having a third region adapted to accept said additional threaded region of said second coupling member and including at least one receptacle positioned to be aligned with at least one of said axially directed openings of said second sleeve and a pin configured to extend into a said axially directed opening and a said receptacle.

5. An assembly as set forth in claim 4 wherein said third coupling member comprises a bulkhead.

6. An assembly as set forth in claim 5 wherein there are two said receptacles in said bulkhead equally spaced from said third region, each said receptacle being alignable with a said axially directed opening in said second sleeve.

7. An assembly as set forth in claim 1 wherein said bias means comprises a spring positioned between one of said coupling members and a said sleeve.

8. An assembly as set forth in claim 7 wherein said spring is positioned between said first coupling member and said first sleeve.

9. An assembly as set forth in claim 7 wherein said spring is a split washer.

10. An assembly as set forth in claim 9 wherein said split washer is a wave washer.

11. An assembly as set forth in claim 9 wherein said split washer is a belleville washer.

12. A locking assembly which is adapted to lock together a pair of mated coupling nuts to make them secured from loosening, comprising:

a first tubular sleeve having a rear opening with an inner surface configured to slideably fit over wrench engageable surfaces of one of said coupling nuts and rotatably lock therewith;

said first tubular sleeve having a forward edge ring of ratchet teeth about its forward opening;

a second tubular sleeve having a rear opening with an inner surface configured to slideably fit over wrench engageable surfaces of the other of said coupling nuts and rotatably lock therewith;

said second tubular sleeve having a forward edge ring of ratchet teeth about its forward opening;

said first and second tubular sleeves each being adapted to be separately positioned over its respective tube coupling nut so that said forward edge rings of ratchet teeth engage one another;

and spring biased means for holding said sleeves together in a manner such as to allow rotational tightening of said coupling nuts in one circumferential direction and to prevent rotational loosening in the opposite direction except upon application of an opposing force to said spring biasing means.

13. A locking assembly according to claim 12 further comprising:

said first tubular sleeve is adapted to slideably fit over the wrench engageable surfaces of a female coupling nut;

and said second tubular sleeve is adapted to slideably fit over the wrench engageable surfaces of a male coupling nut.

14. A locking assembly according to claim 13 further comprising:

said spring biased means is adapted to react against said female coupling nut and the tubular sleeve fitted over that female coupling nut.

15. A locking assembly according to claim 14 further comprising:

the tubular sleeve fitted over said female coupling nut has a forward opening formed by an annular shoulder extending from its inner surface; and said spring biased means is adapted to react against the annular shoulder.

16. A locking assembly according to claim 15 further comprising:

said spring biased means is a spring washer.

17. A locking assembly according to claim 15 further comprising:

the tubular sleeve fitted over said male coupling nut has a forward opening formed by an annular shoulder extending from its inner surface which serves as a stop to prevent the sleeve from slipping completely over the male coupling nut.

18. A locking assembly according to claim 12 further comprising:

said second tubular sleeve having along its rear edge that forms its rear opening a plurality of axially directed openings adapted to receive a pin fitted within a surrounding bulkhead associated with said second coupling nut to completely lock the second tubular sleeve from rotation.

19. A locking assembly for couplings having a rotatable female collar nut with outer discrete wrench engageable surfaces and a fixed male collar nut with outer discrete wrench engageable surfaces which nuts are screwed together to effect a connection, comprising:

a first tubular sleeve having a rear opening with an inner surface configured to slideably fit over said rotatable female collar nut and engage its outer discrete surfaces, and a forward opening formed by an annular shoulder extending from the inner surface of said sleeve;

said first tubular sleeve having a ring of ratchet teeth on its forward edge surrounding the forward opening, and having an internal spring means adapted to cause a spring bias that urges said tubular sleeve forward;

a second tubular sleeve having a rear opening with an inner surface configured to slideably fit over a rear portion of said male collar nut and engage its outer discrete surfaces, and having a forward opening formed by an annular shoulder extending from its inner surface through which a forward portion of the fixed male collar nut extends;

said second tubular sleeve having a ring of ratchet teeth on its forward edge surrounding the forward opening that cooperatively engage the ring of ratchet teeth on said first tubular sleeve to permit tightening rotation in one direction of said first tubular sleeve with its female collar nut but prevents loosening rotation in the opposite direction;

said second tubular sleeve adapted to have its ratchet teeth disengaged from the ratchet teeth of said first tubular sleeve by the manual pulling back of said first tubular sleeves against the forward spring bias of said internal spring means.

20. A locking assembly according to claim 19 further comprising:

said internal spring means is adapted to fit between the female collar nut and the annular shoulder surrounding the forward opening of said first tubular sleeve.

21. A locking assembly according to claim 20 further comprising:

said internal spring means is a non-planar washer.

22. A locking assembly according to claim 20 further comprising:

said internal spring is a wave washer.

23. A locking assembly according to claim 20 further comprising:

said first tubular sleeve having a rear opening with a hexagonal inner surface, and said second tubular sleeve having a rear opening with a hexagonal inner surface.

24. In combination with a tube coupling having on one tube end a rotatable female collar nut with outer discrete wrench engageable surfaces and on another tube a fixed male collar nut with outer discrete wrench engageable surfaces, the nuts being screwed together to effect a coupling between ends of the tubes, comprising:
- a first tubular sleeve having a rear opening receiving said female collar nut, said rear opening having an inner surface complementary to the outer discrete wrench engageable surface of said rotatable female collar nut;
- said first tubular sleeve having a ring of ratchet teeth on its forward edge surrounding its forward opening;
- said second tubular sleeve having a rear opening receiving said male collar nut, said rear opening having an inner surface complementary to the outer discrete wrench engageable surface of said male collar nut, and a forward opening through which the forward portion of the fixed male collar nut extends;
- said second tubular sleeve having a ring of ratchet teeth on its forward edge surrounding the forward opening that cooperatively engage the ring of ratchet teeth on said first tubular sleeve to permit tightening in one rotational direction of said first tubular sleeve and said female collar nut to said second tubular sleeve and said male collar nut but prevents loosening thereof in the opposite rotational direction;
- said first tubular sleeve having a spring biased means acting against said female collar nut to urge said first tubular sleeve forward and thereby keep its ring of ratchet teeth engaged with the ratchet teeth of said second tubular sleeve but permitting slight backward motion of the first tubular sleeve relative to the female collar nut as the ratchet teeth are moved to accommodate a tightening rotation, and permitting a manual pulling back of said first tubular sleeve against the forward spring bias to disengage the ratchet teeth of said first and second tubular sleeves and thereby allow loosening rotation.

25. The combination according to claim 24 further comprising:
- said first tubular sleeve having a forward opening defined by an annular shoulder extending from its inner surfaces,
- said spring biased means fitted between the rotatable female collar nut and the annular shoulder.

26. The combination according to claim 25 further comprising:
- said spring biased means is a spring washer.

* * * * *